(12) United States Patent
Kraus

(10) Patent No.: US 8,910,620 B2
(45) Date of Patent: Dec. 16, 2014

(54) FLUID VESSEL WITH FILLER PIPE

(75) Inventor: Anton Kraus, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 14/127,175

(22) PCT Filed: Jun. 19, 2012

(86) PCT No.: PCT/EP2012/002570
§ 371 (c)(1),
(2), (4) Date: Dec. 18, 2013

(87) PCT Pub. No.: WO2013/004346
PCT Pub. Date: Jan. 10, 2013

(65) Prior Publication Data
US 2014/0117015 A1 May 1, 2014

(30) Foreign Application Priority Data
Jul. 5, 2011 (DE) .......................... 10 2011 106 663

(51) Int. Cl.
*F01N 3/20* (2006.01)
*B60K 13/04* (2006.01)
*B60K 15/035* (2006.01)

(52) U.S. Cl.
CPC .............. *F01N 3/2066* (2013.01); *B60K 13/04* (2013.01); *B60K 15/035* (2013.01)
USPC .......................... 123/670; 220/86.2; 220/86.1

(58) Field of Classification Search
CPC .... B60K 15/0406; B60K 15/04; B60K 13/04; B60K 2015/03026; B60K 15/03006; B60K 2015/03013; B60K 2015/03585; B60K 2015/0358; B60K 2015/0359; B60K 2015/03547; B60K 2015/0355; F01N 3/2066; F01N 3/18; F01N 3/20; B65D 51/1644; B65D 51/1633; B65D 51/16; B65D 9/38

USPC ................. 220/86.2, 86.1, 562, 288; 123/670
See application file for complete search history.

(56) References Cited

U.S. PATENT DOCUMENTS 4,852,761 A * 8/1989 Turner et al. ................... 220/746
4,917,157 A * 4/1990 Gifford et al. .................. 141/59

(Continued)

FOREIGN PATENT DOCUMENTS

DE 2254892 A1 6/1973
DE 2752645 A1 5/1979

(Continued)

OTHER PUBLICATIONS

Translation of DE19859117 (Tuckey et al.) Jul. 29, 1999, p. 5.*

(Continued)

*Primary Examiner* — Robert J Hicks
(74) *Attorney, Agent, or Firm* — Barnes & Thornburg LLP

(57) ABSTRACT

A fluid vessel, in particular a liquid vessel, in particular for an exhaust-gas purification fluid for the treatment of exhaust gas of an internal combustion engine, in particular for an aqueous urea solution, wherein the fluid vessel has a filler pipe which is connected in fluid-conducting fashion to an interior of the fluid vessel and which, at an end remote from the interior of the fluid vessel, has a filler head and is closed off by means of a removable tank cover, wherein the fluid vessel and the filler pipe are designed and arranged such that, when the fluid vessel is in an installed position, a geodetically highest point of the fluid vessel is situated geodetically lower than the filler head. One ventilation device is arranged in the tank cover and at the geodetically highest point, when the fluid vessel is in the installed position, of the fluid vessel.

7 Claims, 3 Drawing Sheets

(56) References Cited

U.S. PATENT DOCUMENTS

| | | | |
|---|---|---|---|
| 4,919,103 A * | 4/1990 | Ishiguro et al. | 123/514 |
| 5,090,459 A * | 2/1992 | Aoki et al. | 141/59 |
| 5,462,100 A * | 10/1995 | Covert et al. | 141/59 |
| 5,535,772 A | 7/1996 | Roetker et al. | |
| 5,630,445 A * | 5/1997 | Horiuchi et al. | 137/592 |
| 5,669,361 A * | 9/1997 | Weissinger et al. | 123/520 |
| 6,354,280 B1 * | 3/2002 | Itakura et al. | 123/519 |
| 7,055,556 B2 * | 6/2006 | Benjey et al. | 141/6 |
| 2005/0178365 A1 * | 8/2005 | Washeleski et al. | 123/478 |
| 2006/0118202 A1 * | 6/2006 | Barnes et al. | 141/348 |

FOREIGN PATENT DOCUMENTS

| | | |
|---|---|---|
| DE | 4343498 A1 | 6/1994 |
| DE | 19801512 A1 | 9/1998 |
| DE | 19859117 A1 | 7/1999 |
| DE | 102008014579 A1 | 6/2009 |
| DE | 102009026280 A1 | 2/2010 |
| EP | 0790144 A2 * | 8/1997 ....... B60K 15/03519 |
| EP | 1600317 A1 * | 11/2005 ....... B60K 15/03504 |
| GB | 2343427 A | 5/2000 |

OTHER PUBLICATIONS

Translation of DE19801512 (Rhein Bonar Kunststoff Technik) Sep. 10, 1998, pp. 3 and 7.*

Search Report for German Patent Application No. 10 2011 106 663.6; Apr. 18, 2012.

Search Report and Written Opinion for International Patent Application No. PCT/EP2012/002570; Oct. 12, 2012.

* cited by examiner

FLUID VESSEL WITH FILLER PIPE

PRIORITY CLAIM

This patent application is a U.S. National Phase of International Patent Application No. PCT/EP2012/002570, filed 19 Jun. 2012, which claims priority to German Patent Application No. 10 2011 106 663.6, filed 5 Jul. 2011, the disclosures of which are incorporated herein by reference in their entirety.

SUMMARY

The present disclosure relates to a fluid vessel, in particular for an exhaust-gas purification fluid for the treatment of exhaust gas of an internal combustion engine, in particular for an aqueous urea solution, wherein the fluid vessel has a filler pipe which is connected in fluid-conducting fashion to an interior of the fluid vessel and which, at an end averted from the interior of the fluid vessel, has a filler head and is closed by means of a detachable tank cap, wherein the fluid vessel and the filler pipe are designed and arranged such that, in an installed position of the fluid vessel, a geodetically highest point of the fluid vessel lies geodetically lower than the filler head.

BRIEF DESCRIPTION OF THE DRAWINGS

Illustrative embodiments are explained in more detail below on the basis of the drawings, in which.

DETAILED DESCRIPTION OF THE DISCLOSED EMBODIMENTS

Illustrative embodiments provide a vessel which has high resistance to ice pressure, few components and a simple mechanical construction.

In the case of a fluid vessel, in each case one deaeration device is arranged in the tank cap and at the point which is the geodetically highest point of the fluid vessel when the fluid vessel is in the installed position.

No additional measures are necessary to prevent overfilling of the tank even in the case of high filling rates and to simultaneously ensure an outflow of the fluid out of the filler pipe after a replenishment process, such that freezing of fluid in the filler pipe at low ambient temperatures is prevented in an effective manner.

High filling rates with fast deaeration of the interior of the fluid vessel during the filling of the fluid vessel with a fluid, and a simultaneous limitation of the level in the fluid vessel, are achieved by virtue of an immersion pipe being provided so as to connect the interior of the vessel to the filler head in fluid-conducting fashion, wherein the immersion pipe, at an end facing toward the interior of the fluid vessel, projects into the interior.

An undesired rise of fluid as far as the filler head via the immersion pipe is prevented in an effective manner by virtue of the immersion pipe being connected in fluid-conducting fashion to the filler head via a deaeration line, wherein a bubble section is arranged in the deaeration line.

An inadvertent return flow out of the fluid vessel via the filler pipe is prevented in an effective manner by virtue of a check valve being arranged and formed in the filler pipe such that the check valve permits a fluid flow in the direction of the interior of the fluid vessel and blocks a fluid flow in the opposite direction.

Complete filling of the fluid vessel without an undesired excessive pressure build-up in the fluid vessel during the filling process is achieved in that, when the fluid vessel is in the installed position, the check valve is arranged geodetically higher than the geodetically highest point of the fluid vessel. Furthermore, this means that the check valve does not need to be designed to be resistant to ice pressure.

A simple and functionally reliable deaeration function is realized in that the deaeration device in the tank cap and/or at the geodetically highest point are/is a diaphragm, in particular a PTFE (polytetrafluoroethylene) diaphragm.

Particularly high filling rates are achieved in that the deaeration device at the geodetically highest point of the fluid vessel is a throttle bore, wherein a fluid-conducting connection is formed from the throttle bore to the filler head.

Figure 1:
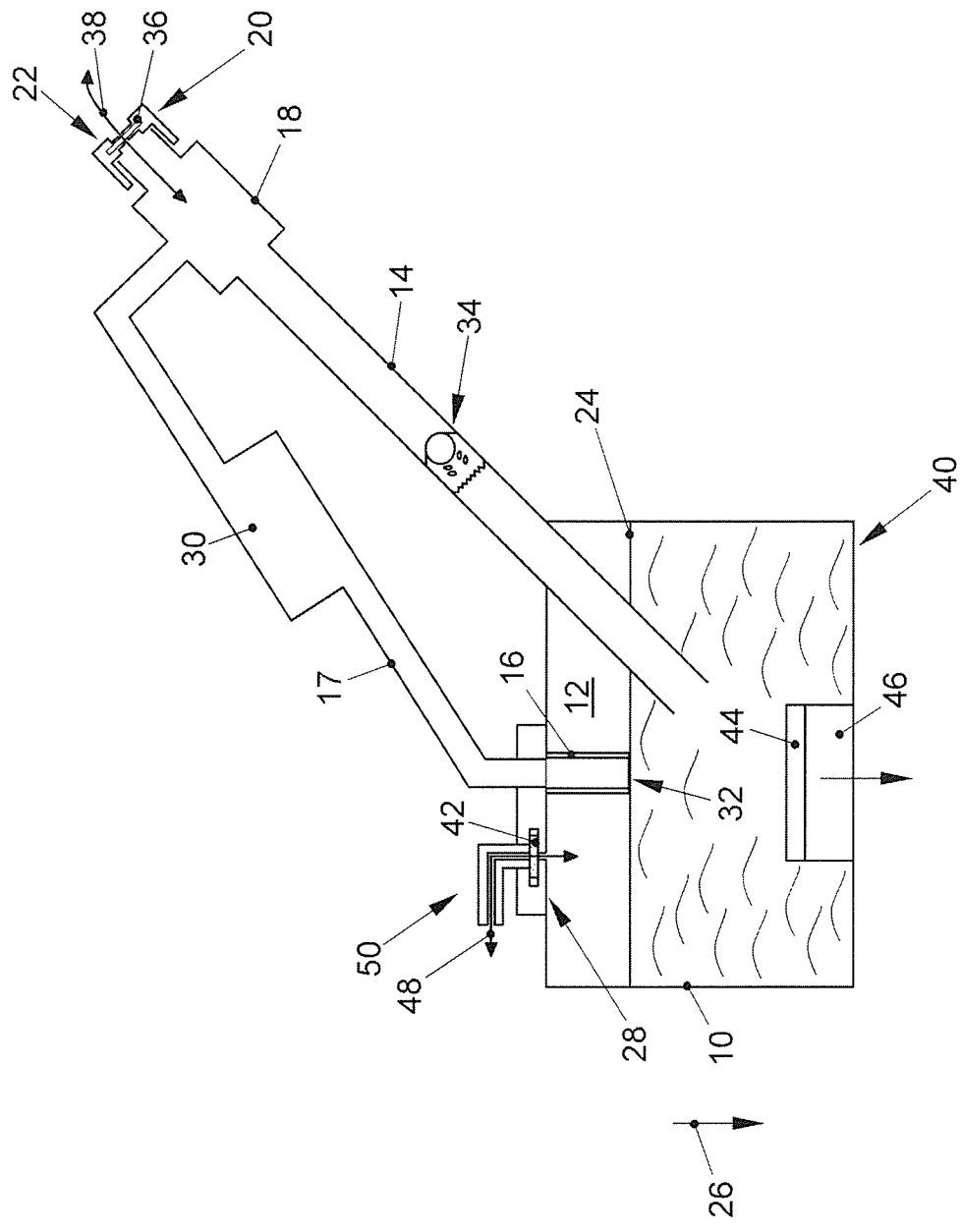
FIG. 1 shows a first disclosed embodiment of a fluid vessel in a schematic sectional view.

The first disclosed embodiment, illustrated in FIG. 1, of a fluid vessel 10 is illustrated in an installed position, a direction of gravity 26 being oriented downward in FIG. 1, and has an interior 12 into which a filler pipe 14 and an immersion pipe 16 open out. The filler pipe 14 serves for the filling of the interior 12 of the fluid vessel 10 with a fluid 24, such as for example an aqueous urea solution for the treatment of exhaust gas of an internal combustion engine (not illustrated). A urea solution of the type has the characteristic that it freezes at an ambient temperature of approximately −11° C. Owing to this particular characteristic of the fluid 24, certain precautions must be taken to ensure the functionality of the fluid vessel 10 at all encountered ambient temperatures.

A filler head 18 is arranged in the filler pipe 14 at an end 22 averted from the interior 12, and the end 22 is closed off by means of a detachable tank cap 20. The filler head 18 and the end 22 with the tank cap 20 are situated geodetically higher than a geodetically highest point 28 of the fluid vessel 10. The immersion pipe 16 projects into the interior 12 and is connected to the filler head 18 via a deaeration line 17 such that a fluid-conducting connection is produced between the interior 12 and the filler head 18 via the immersion pipe 16 and the deaeration line 17. A bubble section 30 is arranged in the deaeration line 17. In the filler pipe 14 there is arranged a check valve 34 which permits a fluid flow in the direction of the interior 12 of the fluid vessel 10 and which blocks a fluid flow in the opposite direction, that is to say from the interior 12 of the fluid vessel 10 to the filler head 18 via the filler pipe 14.

On a base 40 of the fluid vessel 10, at a geodetically lowest point, there is provided an extraction device 46 for the extraction of fluid 24 from the fluid vessel 10 for the fluid 24 to be supplied for an intended use. The intended use is for example the treatment of exhaust gases of an internal combustion engine in a motor vehicle by means of the fluid 24 for the purpose of pollutant reduction.

A first aeration and deaeration device 36, such as for example a valve or a PTFE (polytetrafluoroethylene) diaphragm, is provided in the tank cap 20. The first aeration and deaeration device 36 is sealed with respect to, or impermeable to, liquids or the fluid 24, and is permeable to gases, as indicated by arrows 38. In this way, pressure equalization with the environment can be realized by means of the passage of gases through the first aeration and deaeration device 36. During an extraction of fluid 24 from the fluid vessel 10, a negative pressure relative to the environment is generated in the interior 12. Under the action of an ambient positive pressure, this would possibly lead to an undesired contraction, and thus plastic deformation, of the fluid vessel 10, possibly resulting in damage to the fluid vessel 10. The pressure equalization, or the aeration and deaeration of the interior 12 of the fluid vessel 10, via the first aeration and deaeration device 36 prevents pressure differences between the interior 12 of the fluid vessel 10 and the environment, and thus prevents any damage to the fluid vessel 10 resulting from plastic deformation owing to pressure differences between the interior 12 and the environment.

An open end 32, facing toward the interior 12, of the immersion pipe 16 serves for deaeration of the interior 12 during the filling of the fluid vessel 10, and simultaneously limits the maximum fluid level in the interior 12. Specifically, when the fluid level reaches the open end 32 of the immersion pipe 16 during a replenishment of the fluid vessel 10 via the filler pipe 14 by means of a filler nozzle (not illustrated), fluid 24 rises in the immersion pipe 16 and the deaeration line 17 and floods the filler head 18. This causes a shut-off mechanism of the filler nozzle, which projects at least partially into the filler head 18, to be triggered, and further filling of the fluid vessel 10 is stopped. Directly after the shut-off of the filler nozzle, fluid 24 is thus situated in the immersion pipe 16, in the deaeration line 17 and in the filler pipe 14 up to the filler head 18.

If, in this state, for example, a vehicle equipped with the fluid vessel 10 was shut off for a relatively long time at ambient temperatures lower than the freezing point of the fluid 24, aeration of the fluid vessel 10 would not be ensured during a subsequent, relatively long period of driving operation in which fluid 24 is extracted continuously from the interior 12 for example for the purposes of exhaust-gas treatment, because a tank heater 44 arranged on the base 40 (geodetically lowest point of the fluid vessel 10) is not capable of thawing the deaeration paths (substantially the deaeration line 17). In order, in this state, to prevent a deformation of the fluid vessel 10 as a result of consumption of the fluid 24, a second aeration and deaeration device 42, for example in the form of a valve, is provided at the geodetically highest point 28 of the fluid vessel 10.

In the first disclosed embodiment as per FIG. 1, the second aeration and deaeration device 42 is a PTFE (polytetrafluoroethylene) diaphragm, which is connected to the environment via a pipe 50. The second aeration and deaeration device 42 is sealed with respect to, or impermeable to, liquids or the fluid 24, and is permeable to gases, as indicated by the arrow 48. In this way, a pressure equalization with the environment can be realized by means of the passage of gases through the first aeration and deaeration device 36. Owing to the arrangement of the second aeration and deaeration device 42, a pressure equalization between the interior 12 of the fluid vessel 10 and the environment can take place via the second aeration and deaeration device even when possibly frozen fluid 24 is situated in the immersion pipe 16 and/or in the deaeration line 17. However, this is basically prevented by the second aeration and deaeration device 42 because the fluid 24 that may be present in the immersion pipe 16, in the deaeration line 17 and in the filler pipe 14 at the end of a filling or replenishment of the fluid vessel 10 with fluid 24 can flow out into the interior 12 of the fluid vessel 10 because a corresponding positive pressure in the interior 12, which would prevent such an outflow, can be dissipated via the second aeration and deaeration device 42. At the same time, a negative pressure that may arise in the deaeration line 17 and in the filler pipe 14 as a result of the outflow is dissipated via the first aeration and deaeration device 36 in the tank cap 20. Freezing-up of the second aeration and deaeration device 42 is also not possible because it is situated at the geodetically highest point of the fluid vessel 10 and is thus always situated above the fluid level and spaced apart from the fluid level.

Figure 2:
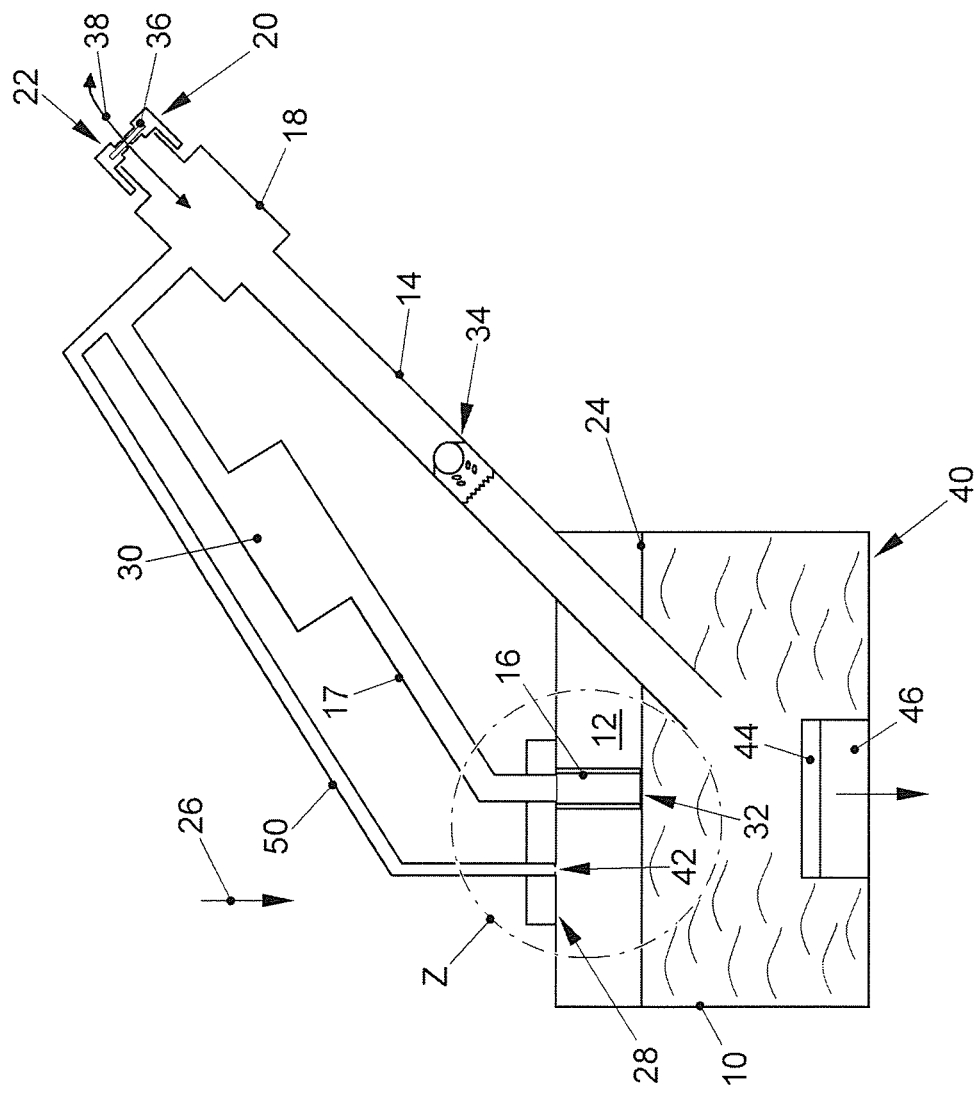
FIG. 2 shows a second disclosed embodiment of a fluid vessel in a schematic sectional view.
Figure 3:
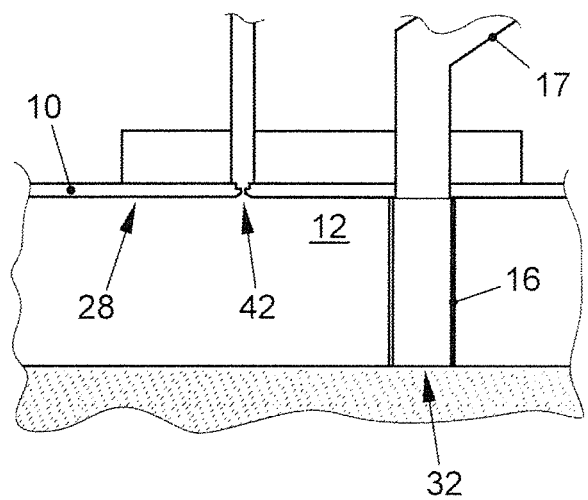
FIG. 3 shows the detail Z of FIG. 2 in a schematic sectional view.

A second disclosed embodiment of a fluid vessel 10 is illustrated in FIGS. 2 and 3, wherein functionally identical parts in FIGS. 2 and 3 are noted by the same reference numerals as in FIG. 1, such that for the explanation of the parts, reference is made to the above description of FIG. 1. By contrast to the first disclosed embodiment as per FIG. 1, it is provided in the second disclosed embodiment as per FIGS. 2 and 3 that the second aeration and deaeration device 42 is formed not as a diaphragm but as a throttle bore, and that the pipe 50 opens out not into the environment but into the filler head 18. In this way, a gas exchange with the environment takes place only via the first aeration and deaeration device 36, as indicated by arrows 38. The pipe 50 bypasses the immersion pipe 16 and the filler pipe 14, such that deaeration of the interior 12 can take place even when the immersion pipe 16 and filler pipe 14 are filled with fluid 24. In this way, it is also the case in the second disclosed embodiment that an outflow of fluid 24 from the immersion pipe 16 and from the filler pipe 14 is ensured. The throttle bore has for example a diameter of less than 1.5 mm, whereby a good deaeration of gas or a good outflow of gas from the interior 12 of the fluid vessel 10 to the filler head 18 is realized.

Unless expressly stated otherwise, the following discussion of further aspects of the invention applies in very general terms independently of the disclosed embodiments described in specific terms above.

Owing to the aeration and deaeration via the respective second aeration and deaeration device 42, pressure equalization to atmospheric pressure or ambient pressure takes place after the completion of the filling process. As a result of the follow-up flow of air through the first aeration and deaeration device 36 in the tank cap 20, the fill level in the filler pipe 14 and in the immersion pipe 16 and the deaeration line 17 will slowly fall. Because of this, the filler pipe 16 and components thereof, in particular the check valve 34, need not be designed to be resistant to ice pressure. Furthermore, aeration of the interior 12 of the fluid vessel 10 is always possible even under the most adverse conditions, with frozen fluid 24 situated in the filler pipe 14 and a long period of driving operation of a vehicle equipped with the fluid vessel 10, in which fluid is extracted from the fluid vessel 10.

The throttle bore permits filling rates of up to 40 l/min for a replenishment of the fluid vessel 10 by means of a filling nozzle.

In the design variant with a throttle bore (FIGS. 2 and 3), the pressure equalization takes place via the throttle and the pipe 50 (connecting line to the filler head 18) and then via the tank cap 20. Since no fluid is situated in the pipe 50 before a replenishment of an empty or partially empty fluid vessel 10, it is possible here for the air to escape from the interior 12 without having to bubble through a liquid column. The size of the throttle bore is selected such that, in the case of low filling rates, an acceptable refill flow rate is achieved and, in cases in which the fluid 24 is present above the throttle, the fluid 24 can flow out. The inlet of the second aeration and deaeration device 42 in the interior 12 is selected so as to be arranged at a point which is as high as possible in relation to the direction of gravity 26. It is advantageous here that, even in the case of high filling rates, the refill flow rate is limited by the defined leakage in the throttle bore.

In the design variant with diaphragm (FIG. 1), gas can escape from the dead volume above the diaphragm during the replenishment process. Here, for a replenishment with high filling rates, a pressure-maintaining function is provided, in particular in the case of filler pipes 14 with a large geodetic height difference between the fill level in the interior 12 and the filler head 18, to ensure that the filler nozzle is shut off at the correct time.

To ensure that, during driving operation of a motor vehicle equipped with the fluid vessel 10, fluid 24 is prevented from passing into the deaeration line 50 through the throttle bore, a surge baffle is provided, the latter for example being designed as an elongated pipe and being arranged in the interior 12 upstream of the throttle bore.

In at least one disclosed embodiment, the throttle bore and the immersion pipe are formed as one component, which is mounted on the fluid vessel 10 by means of a weld.

Connection nipples (not illustrated) on the filler head 18 for the aeration and deaeration and for the deaeration during replenishment are formed for example as one component (double nipple).

The check valve 34 is arranged outside the fluid vessel 10 at a coupling point which is generally used for the separate mounting of the fluid vessel 10 and of the filler pipe 14 on an assembly line.

The check valve 34 is for example in the form of a foil valve, spring-loaded ball valve or spring-loaded flap valve.

Vessels for exhaust-gas purification fluids, such as for example SCR (Selective Catalytic Reduction) vessels for urea solutions, require aeration and deaeration owing to the consumption of the exhaust-gas purification fluid, owing to temperature changes or owing to changes in atmospheric air pressure (for example in the case of travel on mountain roads or in the case of air freight transport). This is required owing to the limited resistance to negative pressure exhibited by plastics vessels composed for example of HDPE (PE-HD: sparsely branched polymer chains of polyethylene, high density between 0.94 g/cm3 and 0.97 g/cm3, "HD" stands for "high-density").

DE 43 43 498 A1 discloses a fuel tank with a filler pipe and with a ventilation pipe. The ventilation pipe issues into an interior of the fuel tank via a fill level-limiting valve. A receptacle for a tip of a filling nozzle is formed in the filler pipe. The ventilation pipe connects the interior of the fuel tank to the receptacle via a check valve. Since fuel normally has a very low freezing point and such low ambient temperatures are not normally encountered, freezing of the fluid in the aeration and deaeration system of the fuel tank does not normally occur, and it is also not necessary for any countermeasures for this to be implemented in the fuel tank.

In the case of such conventional filling and deaeration systems for fluid vessels, in the case of fluids that freeze already at temperatures of for example around −10° C., such as is the case with aqueous urea solutions for the treatment of exhaust gas of an internal combustion engine, particular attention must be paid to ensuring that, after a replenishment process, no fluid remains in the ventilation pipe or filler pipe and possibly freezes there and thereby blocks corresponding deaeration devices. Specifically, in the case of a blocked deaeration device, a situation may arise in which the fluid vessel, owing to a lack of resistance to negative pressure, contracts and is thereby possibly damaged during the extraction of fluid from the fluid vessel. The components involved in the aeration and deaeration must therefore be resistant to ice, resulting in high production costs.

LIST OF REFERENCE NUMERALS

10 Fluid vessel
12 Interior of fluid vessel 10
14 Filler pipe
16 Immersion pipe
17 Deaeration line
18 Filler head
20 Tank cap
22 End of filler pipe 14 averted from interior 12
24 Fluid
26 Direction of gravity
28 Geodetically highest point of fluid vessel 10
30 Bubble section
32 Open end of immersion pipe 16 facing toward interior 12
34 Check valve
36 First aeration/deaeration valve on the tank cap
38 Arrow: gas passage through first aeration and deaeration device 36
40 Base (geodetically lowest point of fluid vessel 10)
42 Second aeration and deaeration device at the geodetically highest point of fluid vessel
44 Tank heater
46 Extraction device
48 Arrow: gas passage through second aeration and deaeration device 42
50 Pipe

The invention claimed is:

1. A fluid vessel for an exhaust-gas purification fluid for the treatment of exhaust gas of an internal combustion engine for an aqueous urea solution, the fluid vessel comprising:
a filler pipe which is connected in fluid-conducting fashion to an interior of the fluid vessel and which, at an end averted from an interior of the fluid vessel, has a filler head;
a detachable tank cap arranged to close the filler pipe, wherein the fluid vessel and the filler pipe are arranged such that, in an installed position of the fluid vessel, a geodetically highest point of the fluid vessel lies geodetically lower than the filler head, and
first and second deaeration devices, wherein, the first deaeration device is arranged in the tank cap and the second deaeration device is arranged at the point which is the geodetically highest point of the fluid vessel when the fluid vessel is in the installed position,
wherein pressure equalization resulting from operation of the first and second deaeration devices to aerate and/or deaerate the interior of the fluid vessel is generated to counteract a negative pressure generated in the vessel interior during extraction of fluid from the fluid vessel.

2. The fluid vessel of claim 1, further comprising an immersion pipe that connects the interior of the fluid vessel to the filler head in fluid-conducting fashion, wherein the immersion pipe, at an end facing toward the interior of the fluid vessel, projects into the interior of the fluid vessel.

3. The fluid vessel of claim 2, wherein the immersion pipe is connected in fluid-conducting fashion to the filler head via a deaeration line, wherein a bubble section is arranged in the deaeration line.

4. The fluid vessel of claim 1, further comprising a check valve arranged and formed in the filler pipe such that said check valve permits a fluid flow in the direction of the interior of the fluid vessel and blocks a fluid flow in the opposite direction.

5. The fluid vessel of claim 4, wherein, when the fluid vessel is in the installed position, the check valve is arranged geodetically higher than the geodetically highest point of the fluid vessel.

6. The fluid vessel of claim 1, wherein the first deaeration device in the tank cap and/or the second deaeration device at the geodetically highest point of the fluid vessel is/are implemented as a PTFE (polytetrafluoroethylene) diaphragm.

7. The fluid vessel of claim 1, wherein the second deaeration device at the geodetically highest point of the fluid vessel is implemented as a throttle bore, wherein a fluid-conducting connection is formed from the throttle bore to the filler head.

* * * * *